United States Patent [19]

Brossardt et al.

[11] Patent Number: 5,184,879
[45] Date of Patent: Feb. 9, 1993

[54] AIR CONDITIONING OR COOLING DEVICE FOR A CONTROL CABINET

[75] Inventors: Ansgar Brossardt, Krailling; Manfred Immel, Mittenaar-Bicken; Heinrich Styppa, Giessen, all of Fed. Rep. of Germany

[73] Assignee: Rittal-Werk Rudolf Loh GmbH & Co. KG, Fed. Rep. of Germany

[21] Appl. No.: 691,311

[22] Filed: Apr. 25, 1991

[30] Foreign Application Priority Data

Apr. 26, 1990 [DE] Fed. Rep. of Germany ....... 4013372

[51] Int. Cl.⁵ .......................... H02B 1/32; H05K 7/20
[52] U.S. Cl. .................................. 312/236; 312/257.1; 312/400
[58] Field of Search ....................... 312/236, 400, 257.1

[56] References Cited

FOREIGN PATENT DOCUMENTS 8810228.9  8/1988  Fed. Rep. of Germany .
561603     5/1944  United Kingdom ................ 312/236

Primary Examiner—Peter R. Brown
Attorney, Agent, or Firm—Speckman & Pauley

[57] ABSTRACT

An air conditioning or cooling device for a control cabinet with a spacer frame constructed of horizontal and vertical frames sections, each having fastening bores closed by wall panels and a door of the cabinet and being in the shape of a box. The air conditioning or cooling device is designed with its two exterior dimensions being equal to or less than two corresponding clearances between the vertical and horizontal frame sections of one side of the spacer frame and the air conditioning or cooling device is installed in this side. The installation of the air conditioning or cooling device on or in one side of the control cabinet in different positions, with respect to the interior of the control cabinet, is simply accomplished since the outer end area of at least its vertical sides with fastening edges, can be optionally connected directly or with spacing elements to the facing vertical frame sections of the spacer frame. The air conditioning or cooling device extends into the interior of the control cabinet if fastened directly and, if fastened with the spacing elements, terminates flush with the inner contours of the spacer frame.

25 Claims, 6 Drawing Sheets

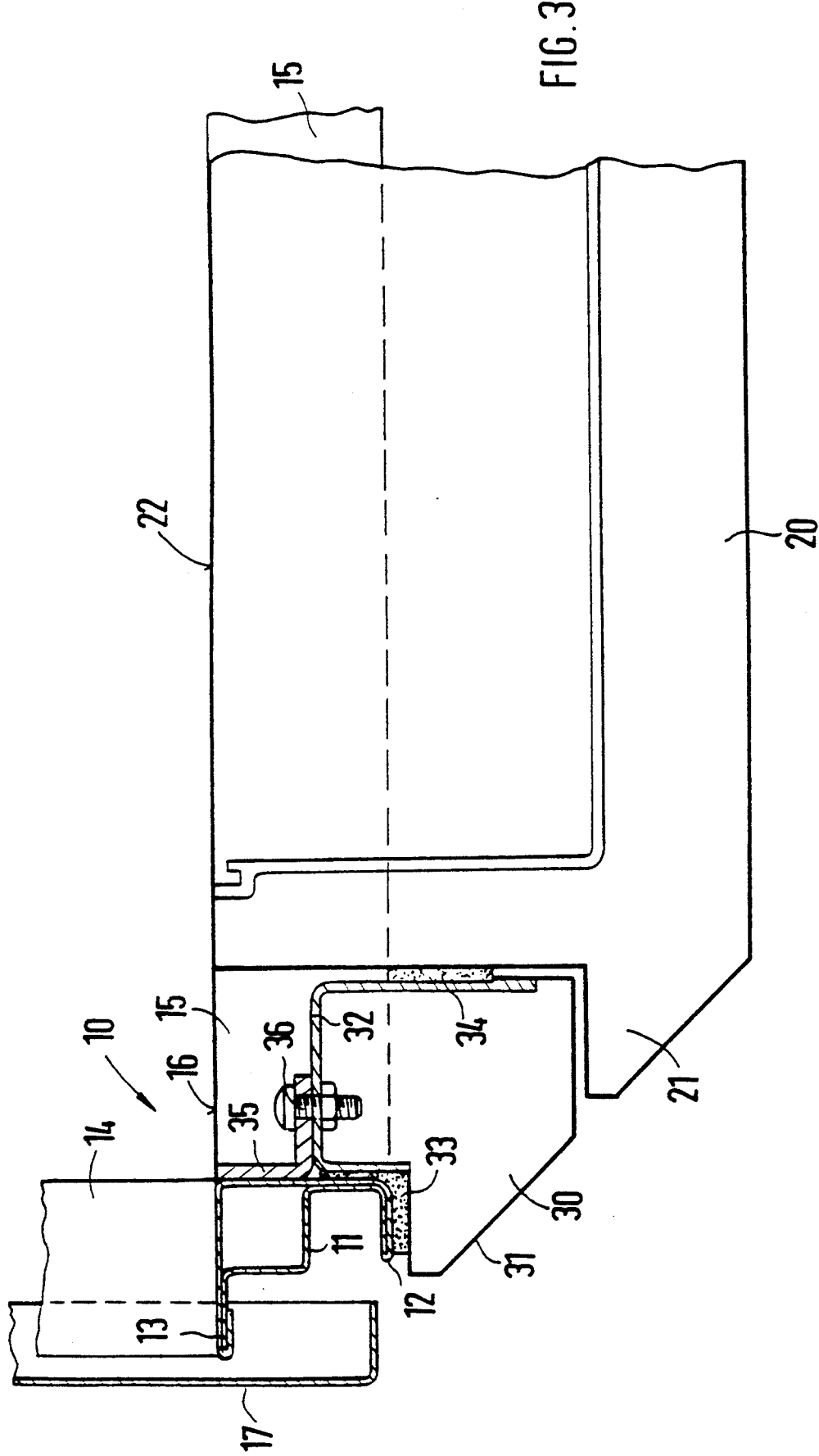

5,184,879

AIR CONDITIONING OR COOLING DEVICE FOR A CONTROL CABINET

BACKGROUND OF THE INVENTION

1. Field of the Invention

This invention relates to an air conditioning or cooling device for a control cabinet with a spacer frame constructed of horizontal and vertical frame sections having fastening bores and closed by wall panels and a door. The cabinet is in the shape of a box, which is designed with its two exterior dimensions being equal to or less than the two clearances between the vertical and horizontal frame sections of one side of the spacer frame and the air conditioning or cooling device is installed in this side.

A spacer frame for a control cabinet of this type is known from German patent publication DE 33 44 598 C1. It is known from a publication by the firm Rittal, entitled "Rittal Handbuch 26" (the English language translation being Rittal Manual 26), pages 289 to 293, to install the door of such a control cabinet in a boxed air conditioning or cooling device. For this purpose, a rectangular cut-out section is made in the door of the cabinet in which the air conditioning or cooling device is installed in such a way that a boxed end portion extends outward from the door of the cabinet. The air conditioning or cooling device is fastened with fastening elements disposed on the interior of the door of the cabinet. To accomplish this, it is necessary to provide the lower part of the air conditioning or cooling device with fastening edges and to insert it into the cut-out section in the door of the cabinet, from the inside of the control cabinet. The covering hood, disposed on the outside of the door of the cabinet, is bolted together with the lower part, which is connected to the door of the cabinet.

An installation of the air conditioning or cooling device in this way requires that the dimensions of the lower part be equal to or less than the clearance between the vertical and horizontal frame sections of the spacer frame which face the side of the cabinet. One disadvantage of such an installation of an air conditioning or cooling device in a control cabinet is that the air conditioning or cooling device always occupies a portion of the interior of the control cabinet when the door of the control cabinet is closed. Another disadvantage is that the air conditioning or cooling device is not very well visually integrated into the outer shape of the control cabinet.

A control cabinet is shown in German patent publication DE 88 10 228 U1, in which a heat exchanger has a lower part with its cross section reduced on all sides, so that the heat exchanger can be installed into a cut-out section in the door of the control cabinet. In this case, the lower part partially extends into the interior of the control cabinet and a major block portion of the heat exchanger extends away from the outside of the door of the control cabinet. But the heat exchanger can also be mounted on the door of the control cabinet, in which case the lower part can be covered with insulating inserts in such a way that it terminates flush with the end area of the heat exchanger. This mode of fastening has the advantage of keeping the interior of the control cabinet clear; however, the entire heat exchanger extends away from the outside of the door of the control cabinet.

SUMMARY OF THE INVENTION

It is one object of this invention to provide an air conditioning or cooling device for a previously described control cabinet, which can be pre-fabricated as a unit and installed as a unit in different positions, in one side of the control cabinet. It is possible to adapt the air conditioning or cooling device to various dimensions of control cabinets, in a simple manner. Satisfactory visual integration with the outer shape of the control cabinet is also obtained.

In accordance with this invention, this object is achieved with the air conditioning or cooling device having fastening edges, on at least its vertical sides, which can be optionally connected directly or with spacing elements to the facing vertical frame sections of the spacer frame. The air conditioning or cooling device extends into the interior of the control cabinet if fastened directly and, if fastened with spacing elements, terminates flush with the inner contours of the spacer frame.

The air conditioning or cooling device is a pre-fabricated, box-shaped or boxed unit with a simple housing and is connected either directly or with adapted spacing elements to the spacer frame of the control cabinet and thus closes off the side of the cabinet, without requiring a wall element. The spacing elements determine the installation position of the air conditioning or cooling device. Because the frame sections of the spacer frame have rows of fastening bores, the installation of the spacing elements or the fastening edges of the air conditioning or cooling device on the spacer frame does not present difficulties.

In accordance with one preferred embodiment, a flush fit of the air conditioning or cooling device with the top and bottom sides of the connecting wall elements of the control cabinet is achieved since one dimension of the air conditioning or cooling device housing corresponds to the clearance between the horizontal frame sections of the spacer frame. The width of the horizontal fastening edges of the air conditioning or cooling device housing corresponds to the dimension of the facing horizontal frame sections. The horizontal fastening edges of the air conditioning or cooling device housing terminate flus with the exterior of the air conditioning or cooling device housing.

The direct installation of the air conditioning or cooling device, which extends into the interior of the control cabinet, is possible since the frame sections of the spacer frame have an abutment bar in the area of the outer contours of the side of the spacer frame which does not extend into the clearance between the frame sections. The width of the air conditioning or cooling device housing conforms to the clearance between the vertical frame sections. The air conditioning or cooling device housing can be directly connected with the abutment bar of the vertical frame sections with its vertical fastening edges.

In accordance with another embodiment for an installation of the air conditioning or cooling device which is flush with the inner contours of the spacer frame, the width of the air conditioning or cooling device housing in the area of the vertical fastening edges is equal to or less than the clearance between the vertical frame sections. Spacing elements are fixed on the air conditioning or cooling device housing following the vertical fastening edges, which cover the vertical frame sections at least in the area of the abutment bars and are connected with the vertical frame sections. In this embodiment, the spacing elements can be constructed in such a way that fastening straps are positioned on the vertical frame sections. A tight fit of the side of the spacer frame and thus the side of the control cabinet is assured since the spacing elements are sealed in the direction of the vertical frame sections and towards the vertical side walls, of the air conditioning or cooling device housing, with sealing elements.

A visually pleasant transition from the control cabinet to the exterior of the air conditioning or cooling device is achieved with the vertical fastening edges of the air conditioning or cooling device housing having inclined outsides which make a transition into the outsides of the air conditioning or cooling device housing. The sheet metal covers of the spacing elements have the same inclination and are coplanar with the outsides of the vertical fastening edges.

If, in accordance with a further embodiment according to this invention, the vertical fastening edges and the vertical spacing elements are separate parts and are connected with the vertical side walls of the air conditioning or cooling device housing, then it is possible to combine different fastening edges and different spacing elements with a uniform air conditioning or cooling device, so that installation on or in control cabinets having different sizes can be made. In this connection it is possible to reduce the amount of parts required for flush installation by combining each of a vertical fastening edge and a vertical spacing element into an enlarged spacing element.

A possibility of combining the spacer frame, the spacing elements and the air conditioning or cooling device housing is distinguished in that the vertical fastening edges overlap the vertical frame sections at least in the area of the abutment bars. Straps are used as spacing elements, one lateral section of which is connected with the vertical frame sections and another lateral section of which is connected with the vertical fastening edge of the air conditioning or cooling device housing.

In accordance with a still further embodiment. the air conditioning or cooling device housing may be constructed in such a way that the vertical fastening edges are either fixedly connected with the air conditioning or cooling device housing or are themselves a part of the air conditioning or cooling device housing, while the vertical spacing elements are constructed as separate parts. In such embodiment, adaptation is provided by the spacing elements.

Application of the spacing elements is made easier since the vertical spacing elements are combined into a frame with horizontal lateral elements. The lateral elements are then covered by the horizontal fastening edges of the air conditioning or cooling device housing.

The horizontal fastening edges may be coplanar with the outside of the air conditioning or cooling device housing or may have outsides which are inclined in the same direction as the vertical fastening edges. The air conditioning or cooling device has at least one ventilation grid or the like in the outside of the air conditioning or cooling device housing.

A further possibility of adapting the air conditioning or cooling device to different heights of the side of the control cabinet results from the adaptation of the top or bottom of the air conditioning or cooling device housing to the height of the wall of the control cabinet with an additional cover extending across the vertical fastening edges and the facing horizontal fastening edge.

This invention will be described in detail with various preferred embodiments shown in the drawings.

BRIEF DESCRIPTION OF THE DRAWINGS

FIG. 3 is a partial cross-sectional view showing the installation of the air conditioning or cooling device flush with the inner contours of the spacer frame;

DESCRIPTION OF PREFERRED EMBODIMENTS

Figure 1:
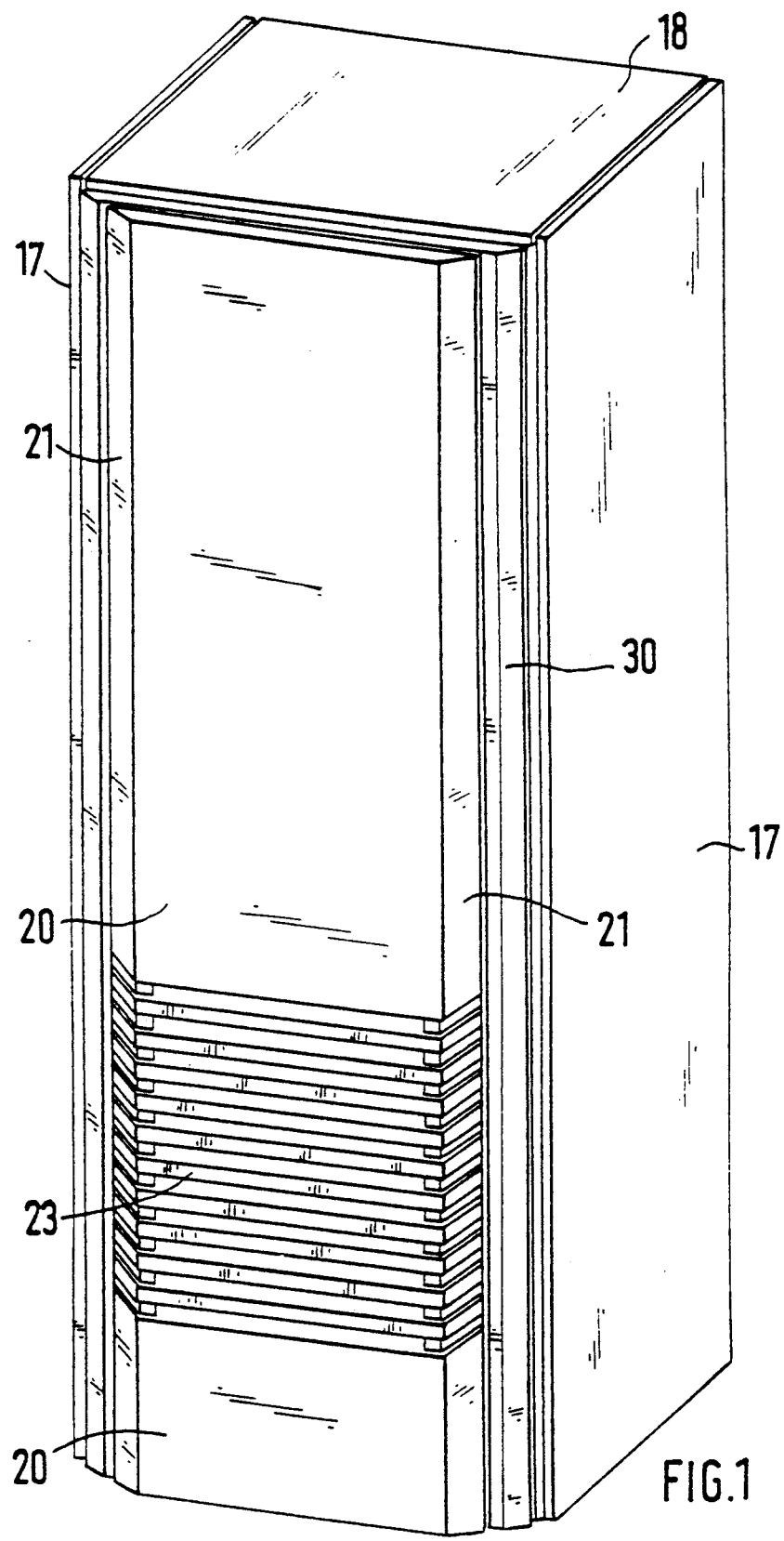
FIG. 1 is a perspective view of a control cabinet with an air conditioning or cooling device attached to the back of the spacer frame with spacing elements.

The back of the control cabinet in accordance with FIG. 1 with the air conditioning or cooling device housing 20 is visible, on the outside of which at least one ventilation grid 23 or the like is installed. The air conditioning or cooling device housing 20 terminates flush with the top and bottom of the side walls 17. The top of the control cabinet is closed by the cover 18. The air conditioner or cooling device housing 20 has fastening edges in the outer end areas of its side walls, of which the vertical fastening edges 21 are inclined with their outsides and make a transition into inclined side walls of the vertical spacing elements 30 of a spacing frame. The horizontal frame sections of the spacing frame are flush with the top and bottom sides of the air conditioning or cooling device housing 20.

Figure 2A:
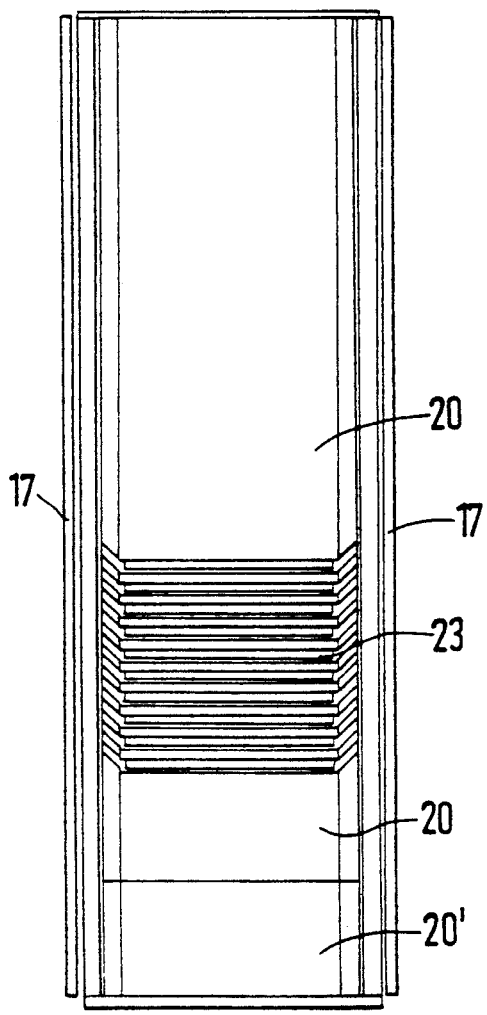
FIGS. 2(A–C) show three views of a control cabinet with the air conditioning or cooling device installed.
Figure 2B:
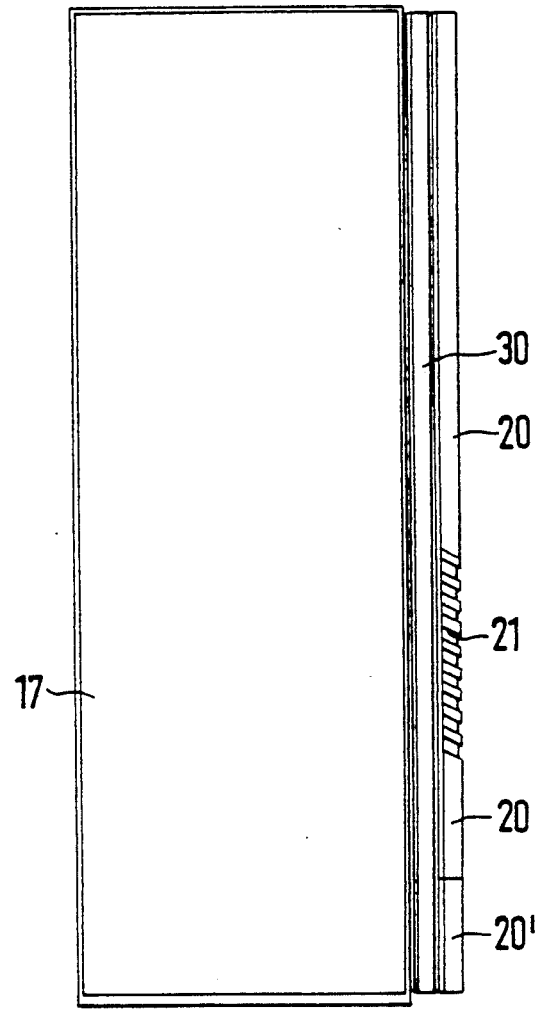
Figure 2C:
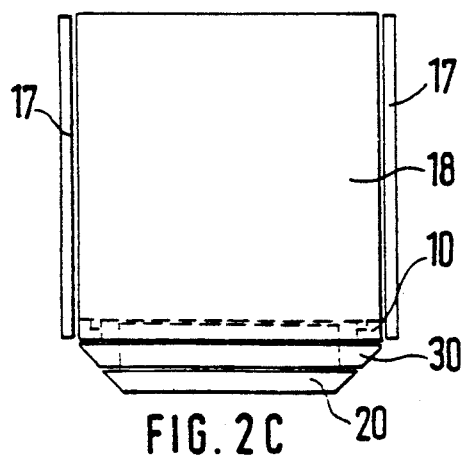

The views in accordance with FIGS. 2(A–C) show a taller control cabinet, in which the same air conditioning or cooling device is installed. The cover element 20, provides the height compensation and extends over the vertical fastening edges 21 and the facing horizontal frame section of the spacer frame 10, completing the cover.

FIG. 3 shows one preferred embodiment of the air conditioning or cooling device installed flush with the inner contour of the spacer frame 10. The air conditioning or cooling device housing 20 has a fixedly secured fastening edge 21 with an inclined outside of the vertical sides, but terminating with the horizontal sides, not shown, flush with the outside of the air conditioner or cooling device housing 20.

The vertical frame section 11 and the horizontal frame sections 14 and 15 of the spacer frame 10 of the control cabinet are visible, which for example as shown in FIG. 3 form the lower left-hand corner of the spacer frame 10. The vertical frame section 11 makes a transition into a sealing bar 13, used for sealing with respect to the side walls 17. The open side of the spacer frame 10 is framed by the sealing bar 13, on which the sealing element 33 is positioned. The inner contour of the spacer frame 10, in particular of the spacer frame side intended for the installation, has been designated by reference numeral 16 and terminates flush with the interior 22 of the air conditioning or cooling device housing 20. So that this flush termination can be achieved, it is necessary to fasten the fastening edge 21 over the spacing element 30 on the spacer frame 10. This vertical spacing element 30 comprises the fastening strap 32 and the sheet metal cover 31. The angle bracket 35 is connected with the vertical frame section 11 and the fastening screw 36 secures the fastening strap 32 with the sheet metal cover 31 or the spacing element 30, on the spacer frame 10. The sealing element 34 provides a seal between the spacing element 30 and the air conditioning or cooling device housing 20. Adjustment into the installation position is provided with the spacing element 30 in order to achieve the flush fit of the inner contour 16 of the spacer frame 10 with the interior 22 of the air conditioning or cooling device housing 20. The outside of the sheet metal cover 31 is inclined the same direction as the outside of the fastening edge 21 of the air conditioning or cooling device housing 20 and thus makes a visual transition into it. The fastening edges and the spacing elements 30 are not inclined at their upper and lower sides in order to achieve a flush termination with the upper sides and the lower sides of the adjacent side walls 17 of the control cabinet, in accordance with FIGS. 1 and 2. The vertical and horizontal spacing elements 30 are combined into a spacing frame, which is easier to install on the spacer frame 10. The exteriors of the horizontal fastening edges of the air conditioning o cooling device housing 20 and of the horizontal spacing elements may, however, also be inclined.

Figure 4:
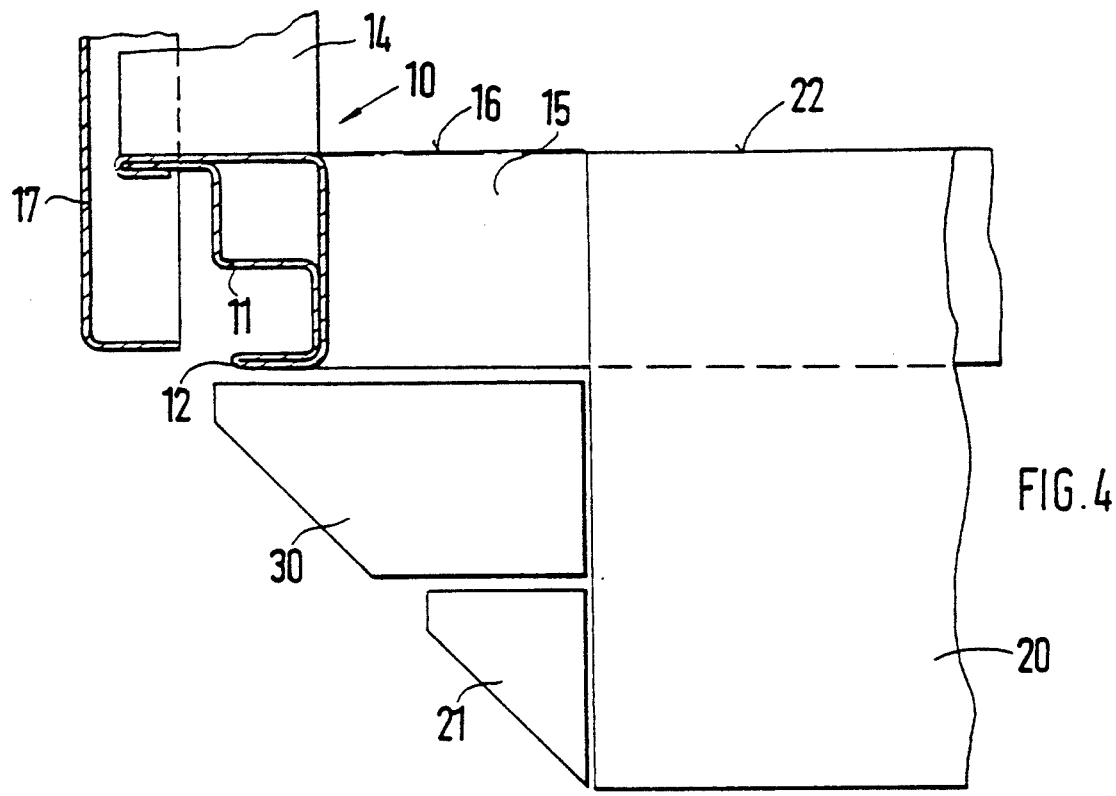
FIGS. 4 to 7 show partial cross-sectional views of four preferred embodiments of the flush installation.

FIG. 4 illustrates another preferred embodiment according to this invention, where the boxed air conditioning or cooling device housing 20 is connected with a fastening edge 21, which is in the form of a frame and may be connected with the air conditioning or cooling device housing 20. Adaptation is provided by the spacing element 30, which is in the form of a spacing frame and which can be tightly connected with the circumferential abutment bar 12 of the spacer frame 10. All that remains for construction is to connect the fastening edge 21 with the spacing element 30.

Figure 5:
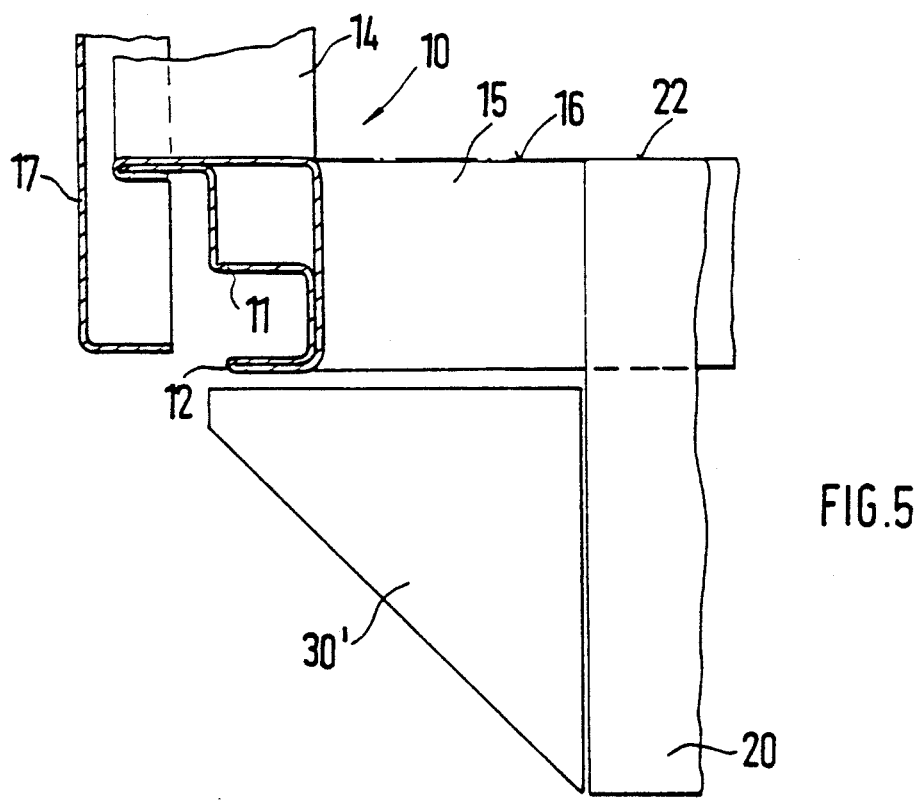

In the preferred embodiment in accordance with FIG. 5, only an enlarged spacing element 30' has been used for the installation of the air conditioning or cooling device 20, which is in the form of a frame and which combines the function of the fastening edge and the spacing element in accordance with FIG. 4. This enlarged spacing element 30' is tightly connected with the side walls of the air conditioning or cooling device housing 20 and the abutment bar 12 of the spacer frame 10.

Figure 6:
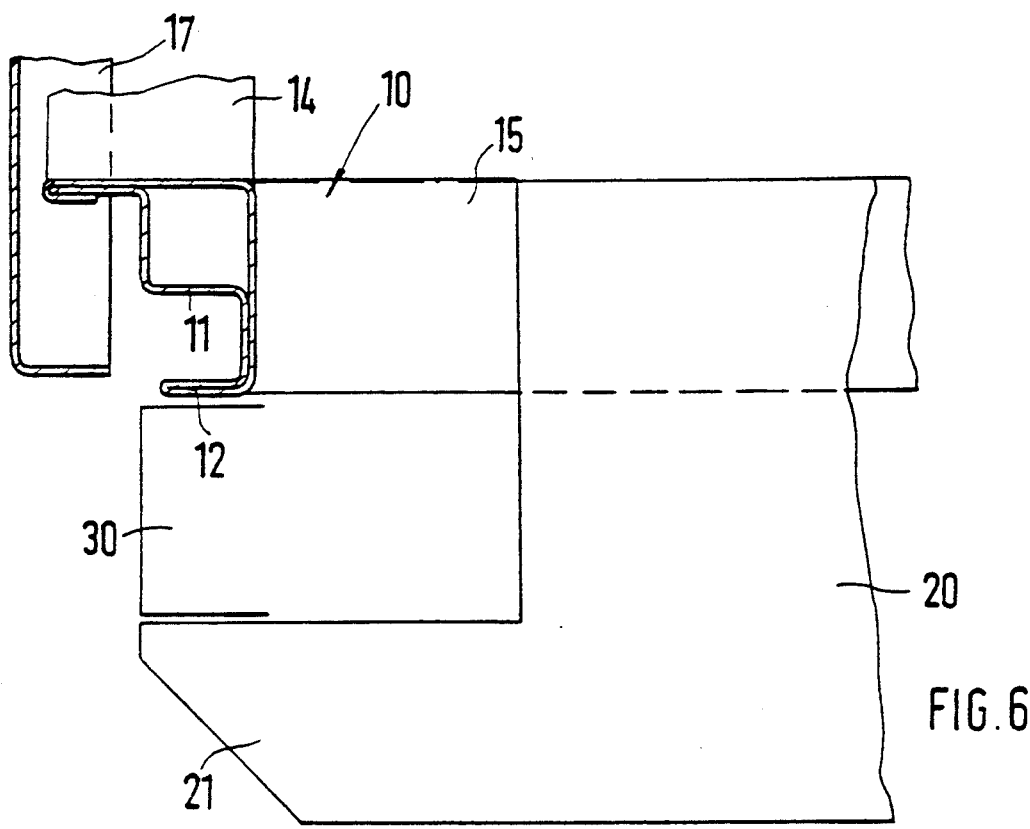
Figure 8:
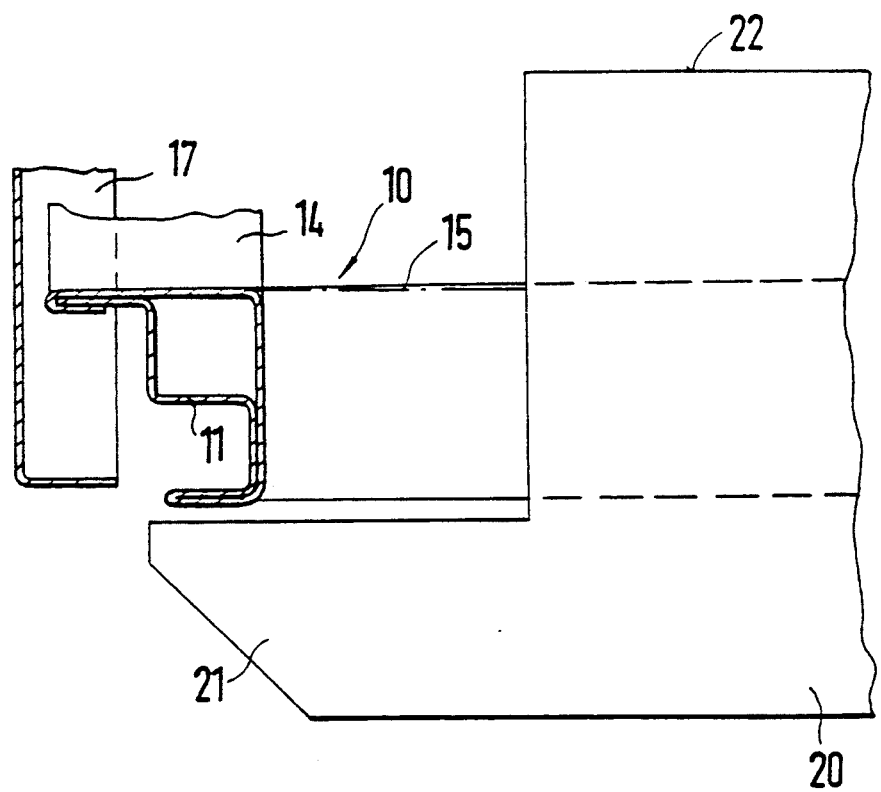
FIG. 8 is a partial cross-sectional view of a direct installation of the air conditioning or cooling device housing having fastening edges, where the air conditioning or cooling device partially extends into the interior of the cabinet.

As shown in FIG. 6, the fastening edge 21, which is fixedly mounted on the air conditioning or cooling device housing 20, may itself overlap the abutment bar 12 of the spacer frame 10 and may thus be connected with the spacer frame 10 either directly or via the spacing element 30. The spacing element 30, in the form of a strap, is fastened with its lateral legs to the abutment bar 12 and the fastening edge 21. The air conditioning or cooling device 20 can then be connected directly with the spacer frame 10 without a spacing element 30, as shown in FIG. 8.

Figure 7:
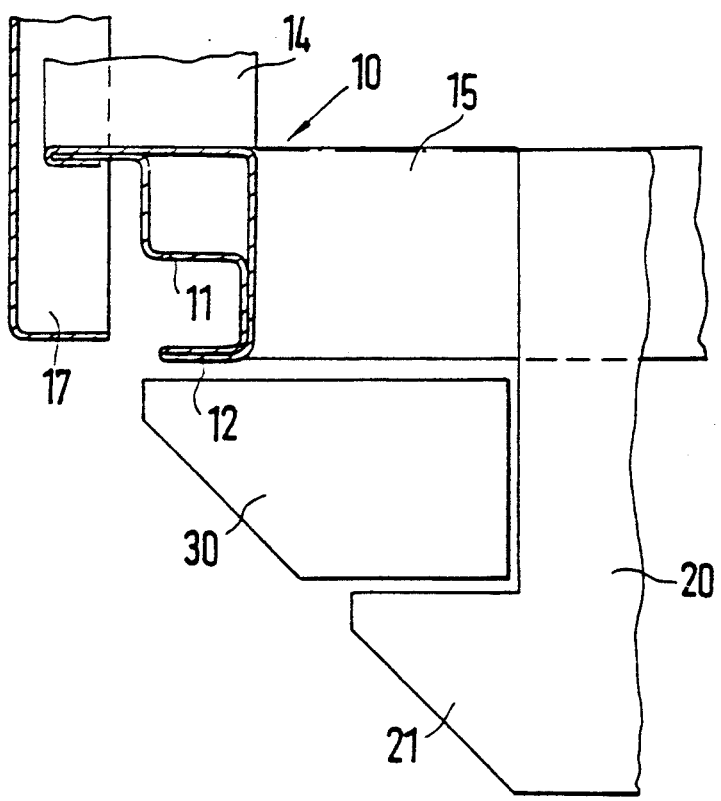

The preferred embodiment in accordance with FIG. 7 essentially corresponds with the preferred embodiment in accordance with FIG. 4. Only the spacing element 30 is connected merely with the abutment bar 12 of the spacer frame 10 and does not extend into the spacer frame with its body.

Figure 9:
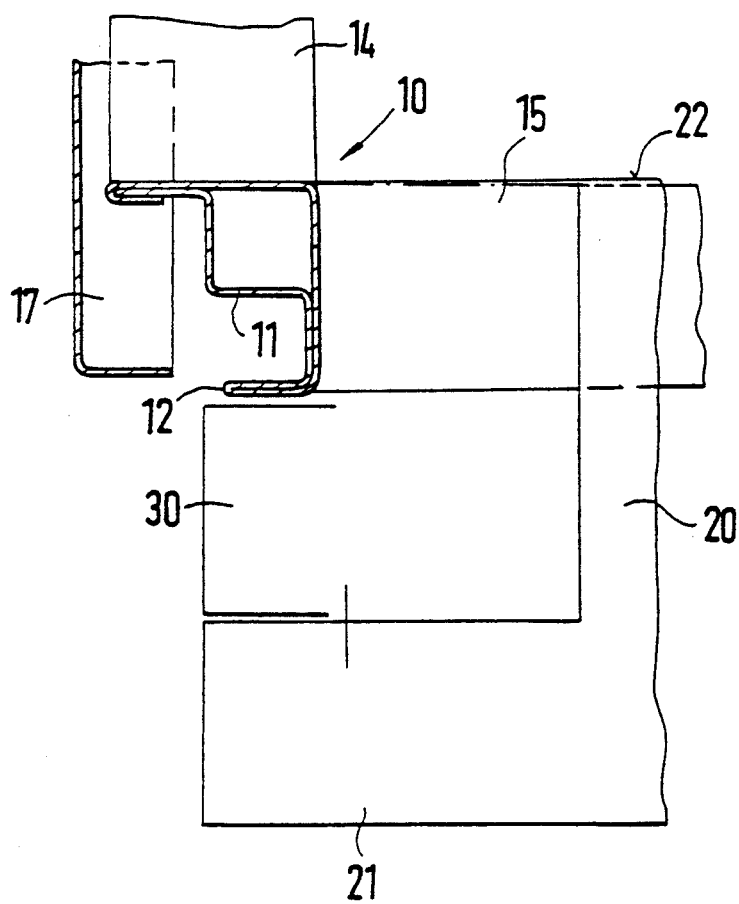
FIG. 9 is a partial cross-sectional view of a further preferred embodiment of a flush installation in the spacer frame.

The preferred embodiment in accordance with FIG. 9 differs from the preferred embodiment in accordance with FIG. 6 by the shape of the fastening edge 21, the outside of which is flush with the outside of the air conditioning or cooling device housing 20 and which makes a flush transition into the spacing element 30, which is in the shape of a strap.

We claim:

1. In an air conditioning device for a control cabinet having a door, a plurality of wall panels, and a spacer frame, the spacer frame being constructed of horizontal frame sections and vertical frame sections, each of the horizontal frame sections and the vertical frame sections having a plurality of fastening bores which are closed by the wall panels and the door, the control cabinet being in a shape of a box, the air conditioning device being constructed with two exterior dimensions being equal to or less than two corresponding clearances between the vertical frame sections and the horizontal frame sections of one side of the spacer frame, and the air conditioning device being installed in the one side of the spacer frame, the improvement comprising:

a fastening edge (21) on each of a plurality of vertical sides of the air conditioning device, each of the fastening edges (21) being connected to a vertical frame section (11) of the spacer frame (10), the spacer frame (10) having an inner contour (16), the air conditioning device extending into an interior of the control cabinet when connected directly to said facing vertical frame section and terminating flush with said inner contour (16) when connected with a plurality of spacing elements (30).

2. In an air conditioning device in accordance with claim 1, wherein an air conditioning device housing (20) of the air conditioning device fits between a horizontal clearance between the horizontal frame sections (15) of the spacer frame (10), a width of each of a plurality of horizontal fastening edges of the air conditioning device housing (20) is adjusted to a dimension of the facing horizontal frame section (15), and the horizontal fastening edges terminate flush with an exterior of the air conditioning device housing (20).

3. In an air conditioning device in accordance with claim 2, further comprising an abutment bar (12) positioned in an area of outer contours of a side of the spacer frame (10) which does not extend into the corresponding clearances between the vertical frame sections (11) and the horizontal frame sections (15), a device width of the air conditioning device housing (20) being adapted to the corresponding clearances between the vertical frame sections (11), and the air conditioning device housing (20) being directly connectable with the abutment bar (12) of the vertical frame sections (11) with the vertical fastening edges (21).

4. In an air conditioning device in accordance with claim 2, wherein a device width of the air conditioning device housing (20) in an area of the vertical fastening edges (21) is equal to or less than each of the corresponding clearances between the vertical frame sections (11), the spacing elements (30) are fixed on the air conditioning device housing (20) following the vertical fastening edges (21) which cover the vertical frame sections (11) at least in an abutment area of the abutment bars (12) and are connected with the vertical frame sections (11).

5. In an air conditioning device in accordance with claim 4, further comprising a plurality of fastening straps (32) positioned on the vertical frame sections (11) which are combined with a sheet metal cover (31) to form the spacing elements (30).

6. In an air conditioning device in accordance with claim 5, further comprising a plurality of sealing elements (33, 34), and the spacing elements (30) being sealed in a sealing direction of the vertical frame sections (11) towards a corresponding plurality of vertical side walls of the air conditioning device housing (20) with the sealing elements (33, 34).

7. In an air conditioning device in accordance with claim 6, wherein the vertical fastening edges (21) of the air conditioning device housing (20) have inclined outside surfaces which make a transition into the outside housing surfaces of the air conditioning device housing (20), and a plurality of sheet metal covers (31) of the spacing elements (30) have a same inclination as and are coplanar with the outside surfaces of the vertical fastening edges (21).

8. In an air conditioning device in accordance with claim 7, wherein the vertical fastening edges (21) and the vertical spacing elements (30) are separate parts and are connected with the vertical sides of the air conditioning device housing (20).

9. In an air conditioning device in accordance with claim 7, wherein the vertical fastening edges (21) and the vertical spacing elements (30) are integrated into a single spacing element (30').

10. In an air conditioning device in accordance with claim 7, wherein the vertical fastening edges (21) overlap the vertical frame sections (11) at least in the abutment area of the abutment bars (12), and the spacing elements (30) are formed as straps with one lateral section connected with the vertical frame sections (11) and another lateral section connected with the vertical fastening edge (21) of the air conditioning device housing (20).

11. In an air conditioning device in accordance with claim 7, wherein the vertical fastening edges (21) are one of fixedly connected with the air conditioning device housing (20) and formed as an integral part of the air conditioning device housing (20), and the vertical spacing elements (30) are separate parts.

12. In an air conditioning device in accordance with claim 11, further comprising a plurality of horizontal lateral elements, and the vertical spacing elements (30) being combined into a frame with the horizontal lateral elements.

13. In an air conditioning device in accordance with claim 12, farther comprising at least one ventilation grid (23) in an outside surface of the air conditioning device housing (20).

14. In an air conditioning device in accordance with claim 13, wherein the air conditioning device housing (20) is adapted at one of a top and a bottom to a height of the wall panels of the control cabinet with an additional cover (20') extending across the vertical fastening edges (21) and the horizontal fastening edge.

15. In an air conditioning device in accordance with claim 4, further comprising a plurality of sealing elements (33, 34), and the spacing elements (30) being sealed in a sealing direction of the vertical frame sections (11) towards a corresponding plurality of vertical side walls of the air conditioning device housing (20) with the sealing elements (33, 34).

16. In an air conditioning device in accordance with claim 4, wherein the vertical fastening edges (21) of the air conditioning device housing (20) have inclined outside surfaces which make a transition into the outside housing surfaces of the air conditioning device housing (20), and a plurality of sheet metal covers (31) of the spacing elements (30) have a same inclination as and are coplanar with the outside surfaces of the vertical fastening edges (21).

17. In an air conditioning device in accordance with claim 1, farther comprising an abutment bar (12) positioned in an area of outer contours of a side of the spacer frame (10) which does not extend into the corresponding clearances between the vertical frame sections (11) and the horizontal frame sections (15), a device width of the air conditioning device housing (20) being adapted to the corresponding clearances between the vertical frame sections (11), and the air conditioning device housing (20) being directly connectable with the abutment bar (12) of the vertical frame sections (11) with the vertical fastening edges (21).

18. In an air conditioning device in accordance with claim 1, wherein a device width of the air conditioning device housing (20) in an area of the vertical fastening edges (21) is equal to or less than each of the corresponding clearances between the vertical frame sections (11), the spacing elements (30) are fixed on the air conditioning device housing (20) following the vertical fastening edges (21) which cover the vertical frame sections (11) at least in an abutment area of a plurality of abutment bars (12) positioned near outer contours of a side of the spacer frame (10) and are connected with the vertical frame sections (11).

19. In an air conditioning device in accordance with claim 1, wherein the vertical fastening edges (21) and the vertical spacing elements (30) are separate parts and are connected with the vertical sides of the air conditioning device housing (20).

20. In an air conditioning device in accordance with claim 1, wherein the vertical fastening edges (21) and the vertical spacing elements (30) are integrated into a single spacing element (30')

21. In an air conditioning device in accordance with claim 1, wherein the vertical fastening edges (21) overlap the vertical frame sections (11) at least in a abutment area of a plurality of abutment bars (12), and the spacing elements (30) are formed as straps with one lateral section connected with the vertical frame sections (11) and another lateral section connected with the vertical fastening edge (21) of the air conditioning device housing (20).

22. In an air conditioning device in accordance with claim 1, wherein the vertical fastening edges (21) are one of fixedly connected with the air conditioning device housing (20) and formed as an integral part of the air conditioning device housing (20), and the vertical spacing elements (30) are separate parts.

23. In an air conditioning device in accordance with claim 1, further comprising a plurality of horizontal lateral elements, and the vertical spacing elements (30) being combined into a frame with the horizontal lateral elements.

24. In an air conditioning device in accordance with claim 1, further comprising at least one ventilating rid (23) in an outside surface of the air conditioning device housing (20).

25. In an air conditioning device in accordance with claim 1, wherein the air conditioning device housing (20) is adapted at one of a top and a bottom to a height of the wall panels of the control cabinet with an additional cover (20') extending across a plurality of vertical fastening edges (21) of the air conditioning device housing (20) and a facing horizontal fastening edge of the air conditioning device housing (20).

* * * * *